United States Patent
Pal et al.

(10) Patent No.: US 12,450,898 B2
(45) Date of Patent: Oct. 21, 2025

(54) SYSTEMS AND METHODS FOR IDENTIFYING LIGHTS SOURCES AT AN AIRPORT

(71) Applicant: HONEYWELL INTERNATIONAL INC., Charlotte, NC (US)

(72) Inventors: Debabrata Pal, Bangalore (IN); Abhishek Alladi, Hyderabad (IN); Anvita Singh, Hyderbad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 434 days.

(21) Appl. No.: 18/173,239

(22) Filed: Feb. 23, 2023

(65) Prior Publication Data

US 2024/0233368 A1   Jul. 11, 2024

(30) Foreign Application Priority Data

Jan. 9, 2023   (IN) .............................. 202311001775

(51) Int. Cl.
*G06V 20/17* (2022.01)
*B64F 1/00* (2024.01)
(Continued)

(52) U.S. Cl.
CPC .............. *G06V 20/17* (2022.01); *B64F 1/002* (2013.01); *G06T 7/50* (2017.01); *G06T 7/70* (2017.01);
(Continued)

(58) Field of Classification Search
CPC ...... G06V 20/17; G06V 20/584; G06V 10/25; G06V 20/58; G06V 10/56; G06V 10/507;
(Continued)

(56) References Cited

U.S. PATENT DOCUMENTS 10,257,472 B2   4/2019   Clemen, Jr. et al.
11,249,173 B2   2/2022   Zhu et al.
(Continued)

FOREIGN PATENT DOCUMENTS

CA   1216933 A   *   1/1987
CN   102384838 A       3/2012
(Continued)

OTHER PUBLICATIONS

H. Chinthaka et al., "Detection of LED traffic light by image processing for visible light communication system," 2009 IEEE Intelligent Vehicles Symposium, Xi'an, China, 2009, pp. 179-184, doi: 10.1109/IVS.2009.5164274, downloaded from IEEE Xplore on Jan. 31, 2023.

(Continued)

*Primary Examiner* — Gandhi Thirugnanam
*Assistant Examiner* — Connor L Hansen
(74) *Attorney, Agent, or Firm* — Ingrassia Fisher & Lorenz, LLP

(57) ABSTRACT

Systems and methods are provided for identifying light sources at an airport. Light sources are detected in a vehicle camera image. A region of interest (ROI) is determined for each light source based on the location of the light source in the image. A distance and relative angle are determined between each light source and a vehicle camera location. A gray scale version of each ROI is generated based on pre-defined relationships between intensities of red, green, and blue colors in the image and gray color intensities. The gray scale version is compared with pre-defined color histograms to determine a color associated with each light source. Each histogram corresponds to a gray-scale equivalent of an associated color. Context data associated with the image is determined. A light source type is assigned to each (Continued)

of the light sources based on the color of the light source and the context data.

20 Claims, 14 Drawing Sheets

(51) Int. Cl.
| | |
|---|---|
| *G06T 7/50* | (2017.01) |
| *G06T 7/70* | (2017.01) |
| *G06V 10/25* | (2022.01) |
| *G06V 10/50* | (2022.01) |
| *G06V 10/56* | (2022.01) |
| *G06V 10/60* | (2022.01) |
| *G06V 20/58* | (2022.01) |

(52) U.S. Cl.
CPC ............ *G06V 10/25* (2022.01); *G06V 10/507* (2022.01); *G06V 10/56* (2022.01); *G06V 10/60* (2022.01); *G06V 20/584* (2022.01); *G06T 2207/20081* (2013.01); *G06T 2207/20084* (2013.01); *G06T 2207/30252* (2013.01)

(58) Field of Classification Search
CPC . G06T 2207/30252; G06T 2207/10032; G06T 7/70; G06T 7/11; G06T 2207/10152
See application file for complete search history.

(56) References Cited

U.S. PATENT DOCUMENTS

| | | |
|---|---|---|
| 2009/0177426 A1 | 7/2009 | Dodds et al. |
| 2016/0252905 A1 | 9/2016 | Tian et al. |
| 2019/0122059 A1* | 4/2019 | Zhou .................... G06V 10/82 |
| 2021/0283513 A1* | 9/2021 | Wildhaber ................ G01S 5/16 |
| 2022/0245842 A1 | 8/2022 | Kurtoglu et al. |

FOREIGN PATENT DOCUMENTS

| | | |
|---|---|---|
| EP | 0558405 A1 | 9/1993 |
| FR | 2977028 A1 | 12/2012 |
| KR | 102083934 B1 | 3/2020 |

OTHER PUBLICATIONS

M. Tarkowski, P. Woznica and L. Kulas, "Efficient algorithm for blinking LED detection dedicated to embedded systems equipped with high performance cameras," IEEE Eurocon 2015—International Conference on Computer as a Tool (EUROCON), Salamanca, Spain, 2015, pp. 1-4, doi: 10.1109/EUROCON.2015.7313723, downloaded from IEEE Xplore on Jan. 31, 2023.

* cited by examiner

Gaussian Distribution. Shape (5,5), Std = 0.5, Range = [0,1]

| 0.0000 | 0.0000 | 0.0002 | 0.0000 | 0.0000 |
| --- | --- | --- | --- | --- |
| 0.0000 | 0.0113 | 0.0837 | 0.0113 | 0.0000 |
| 0.0002 | 0.0837 | 0.6187 | 0.0837 | 0.0002 |
| 0.0000 | 0.0113 | 0.0837 | 0.0113 | 0.0000 |
| 0.0000 | 0.0000 | 0.0002 | 0.0000 | 0.0000 |

Ring Distribution. Shape (5,5), Std = 0.5, Range =[1,255]

| 1 | 1 | 1 | 1 | 1 |
| --- | --- | --- | --- | --- |
| 1 | 5 | 35 | 5 | 1 |
| 1 | 35 | 255 | 35 | 1 |
| 1 | 5 | 35 | 5 | 1 |
| 1 | 1 | 1 | 1 | 1 |

SYSTEMS AND METHODS FOR IDENTIFYING LIGHTS SOURCES AT AN AIRPORT

CROSS-REFERENCE TO RELATED APPLICATION

This application claims priority to India Provisional Patent Application No. 202311001775, filed Jan. 9, 2022, the entire content of which is incorporated by reference herein.

TECHNICAL FIELD

The present invention generally relates to aircraft operations and more particularly relates to systems and methods for detecting properties of lights sources to identify light sources at an airport.

BACKGROUND

Landing during the night and under low visibility conditions may create relatively higher risk aircraft landing situations. Globally, very few airports have Category 3 (CAT-3) runway systems, some airports have Category 2 (CAT-2) runway systems, and many airports have Category 1 (CAT-1) runways. In many instances, airport runways and taxiways may be equipped with relatively poor lighting. Improper maintenance of runway lighting and taxiway lighting systems may result in poor lighting conditions at an airport. Poor lighting conditions may impact aircraft safety in on-the-fly vision-based landings. Poor lighting and other types of low visibility conditions may impact aircraft safety and result in adverse aircraft incidents. Examples of adverse aircraft incidents include, but are not limited to, near misses, accidents, and crashes.

Hence there is a need for aircraft systems and methods that are configured to detect the properties of light sources on runways and taxiways at an airport under poor lighting and low visibility conditions and identify the light sources to reduce the occurrence of adverse aircraft incidents. Examples of light properties include, but are not limited to, light source colors, light source intensities, frequencies of blinking lights s sources, and combinations/arrangement of different types of lights sources.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An exemplary embodiment of a system includes a processor and a memory. The memory includes instructions that upon execution by the processor, cause the processor to: detect a plurality of light sources in a first image received from a vehicle camera; determine a region of interest for each of the plurality of light sources based on a location of the light source in the first image; determine a distance between each of the plurality of light sources and a location of the vehicle camera and a relative angle between each of the plurality of light sources and the location of the vehicle camera; generate a gray scale version of each region of interest based on pre-defined relationships between intensities of a red color, a green color and a blue color in the first image and gray intensities associated with each of the intensities of the red color, the green color, and the blue color; compare the gray scale version of each region of interest with pre-defined color specific histograms to determine a color associated with each of the plurality of light sources, wherein each pre-defined color specific histogram corresponds to a gray-scale equivalent of an associated color; determine context data associated with the first image; and assign a light source type to each of the plurality of light sources based on the color of the light source and the context data.

An exemplary embodiment of a method includes: detecting a plurality of light sources in a first image received from a vehicle camera; determining a region of interest for each of the plurality of light sources based on a location of the light source in the first image; determining a distance between each of the plurality of light sources and a location of the vehicle camera and a relative angle between each of the plurality of light sources and the location of the vehicle camera; generating a gray scale version of each region of interest based on pre-defined relationships between intensities of a red color, a green color and a blue color in the first image and gray intensities associated with each of the intensities of the red color, the green color, and the blue color; comparing the gray scale version of each region of interest with pre-defined color specific histograms to determine a color associated with each of the plurality of light sources, wherein each pre-defined color specific histogram corresponds to a gray-scale equivalent of an associated color; determining context data associated with the first image; and assigning a light source type to each of the plurality of light sources based on the color of the light source and the context data.

Furthermore, other desirable features and characteristics of the system and method for performing identifying light sources at an airport will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
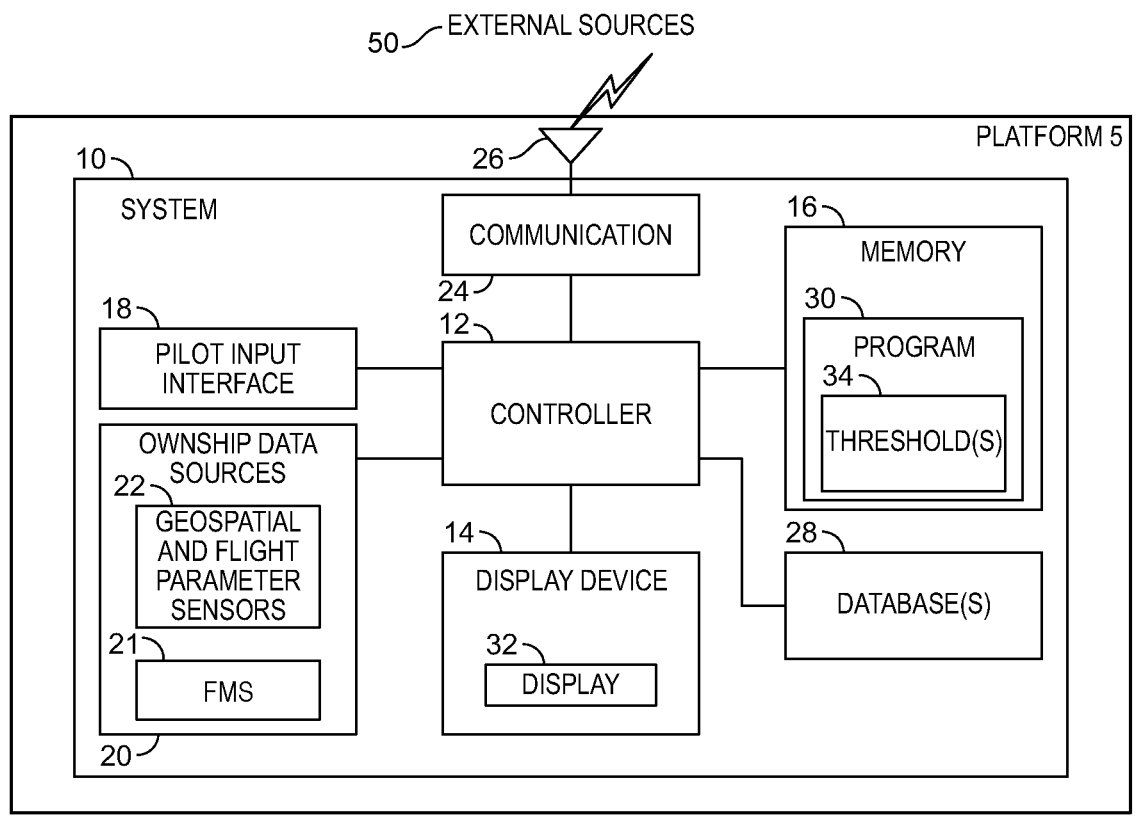
FIG. 1 is a block diagram representation of a system for implementing identification of light sources at an airport in accordance with an exemplary embodiment.

FIG. 1 is a block diagram representation of a system 10 for implementing an airport light source identification system in accordance with an embodiment (shortened herein to "system" 10), as illustrated in accordance with an exemplary and non-limiting embodiment of the present disclosure. The system 10 may be utilized onboard a mobile platform 5, as described herein. In various embodiments, the mobile platform is an aircraft, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, a program 30, that embodies an algorithm described herein for identifying light sources at an airport in accordance with an embodiment on a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic," the communications circuit 24 may incorporate software and/or hardware for communication protocols as needed for traffic collision avoidance (TCAS), automatic dependent surveillance broadcast (ADSB), and enhanced vision systems (EVS).

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to operate when the aircraft is in any phase of flight. The algorithm enables the performance of identification of light sources at an airport in accordance with an embodiment.

In various embodiments, the provided controller circuit 12, and therefore its program 30 may incorporate the programming instructions for: detecting a plurality of light sources in a first image received from a vehicle camera; determining a region of interest for each of the plurality of light sources based on a location of an associated one of the plurality of light sources in the first image; determining a distance between each of the plurality of light sources and a location of the vehicle camera and a relative angle between each of the plurality of light sources and the location of the vehicle camera; generating a gray scale version of each region of interest based on pre-defined relationships between intensities of a red color, a green color and a blue color in the first image and gray intensities associated with each of the intensities of the red color, the green color, and the blue color; comparing the gray scale version of each region of interest with pre-defined color specific histograms to determine a color associated with each of the plurality of light sources, wherein each pre-defined color specific histogram corresponds to a gray-scale equivalent of an associated color; determining context data associated with the first image; and assigning a light source type to each of the plurality of light sources based on the color of the light source and the context data.

Figure 2:
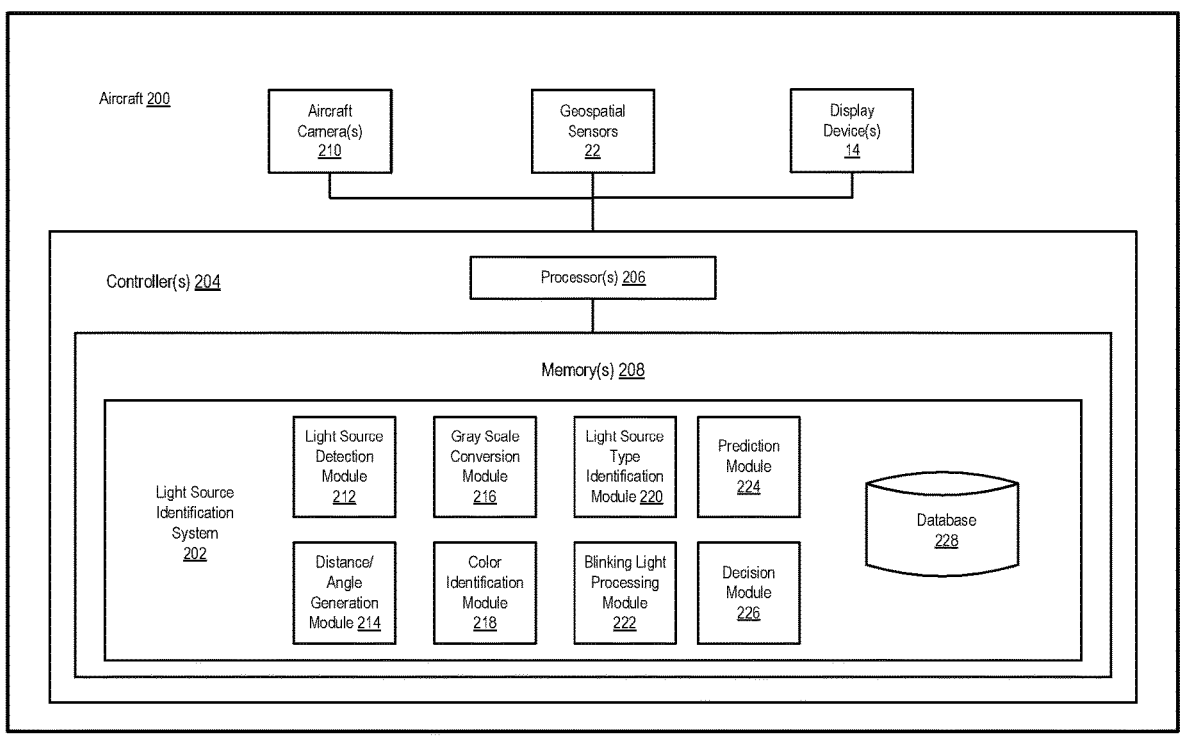
FIG. 2 is a block diagram representation of an aircraft including an exemplary embodiment of a light source identification system.

Referring to FIG. 2, a block diagram representation of an aircraft 200 including an embodiment of a light source identification system 202 is shown. In an embodiment, the configuration of the aircraft 200 is similar to the configuration of the platform 5 described with reference to FIG. 1. The aircraft 200 includes at least one controller 204. The controller 204 includes at least one processor 206 and at least one memory 208. The memory 208 includes an embodiment of the light source identification system 202. In an embodiment, the aircraft 200 includes at least one aircraft camera 210. In an embodiment, an aircraft camera 210 is an external aircraft camera. In an embodiment, the external aircraft camera is disposed at an aircraft nose. In alternative embodiments, an aircraft camera 210 may be disposed at a different part of the aircraft 200. The controller 204 is configured to be communicatively coupled to the aircraft camera(s) 210. The controller 204 is configured to be communicatively coupled to one or more geospatial sensors 22 and to one or more display devices 14.

In an embodiment, the light source identification system 202 includes a light source detection module 212, a distance/angle generation module 214, a gray scale conversion module 216, a color identification module 218, a light source type identification module 220, a blinking light processing module 222, a prediction module 224, a decision module 226, and a database 228. The light source identification system 202 may include additional components that facilitate operation of the light source identification module 202.

Figure 3:
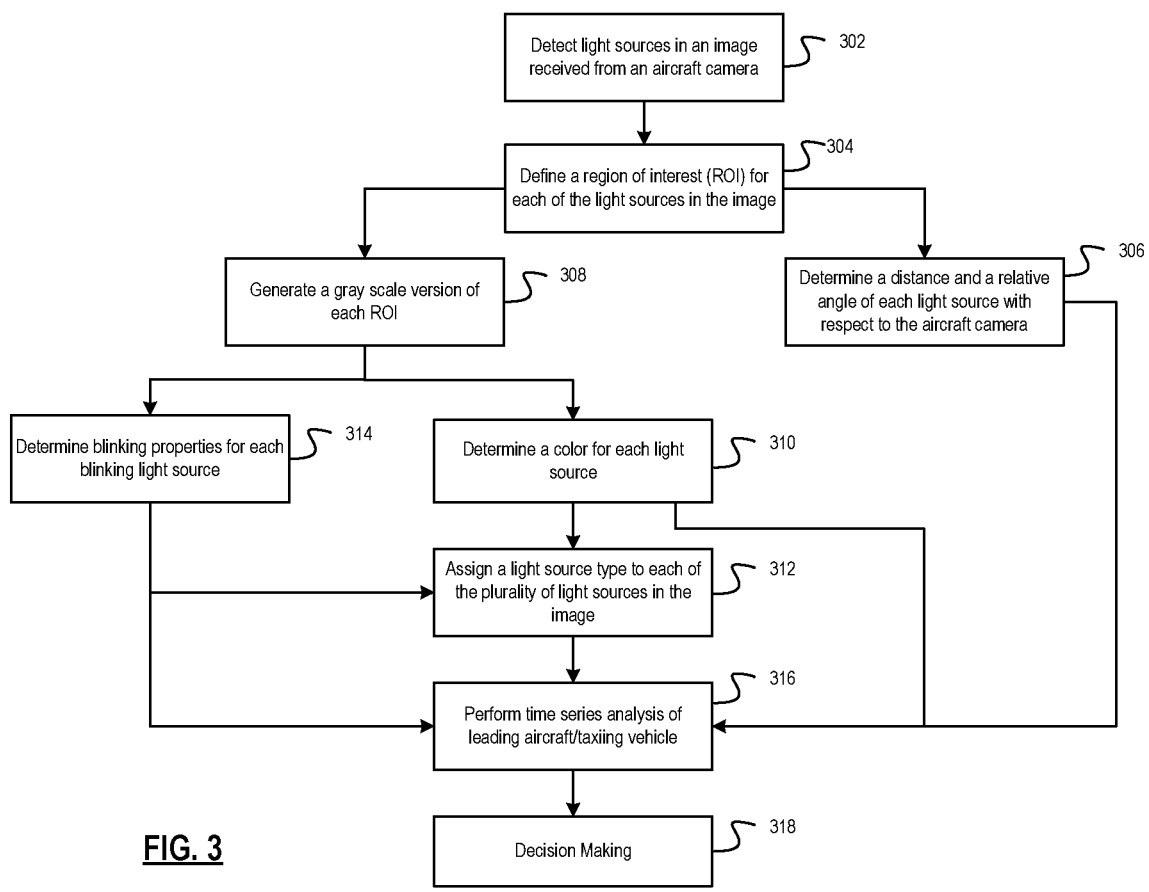
FIG. 3 is a flowchart representation of an exemplary embodiment of a method of implementing identification of light sources at an airport.

Referring to FIG. 3, a flowchart representation of an exemplary embodiment of a method 300 of implementing identification of light sources at an airport is shown. The method 300 is implemented by the light source identification system 202.

At 302, a plurality of light sources are detected in an image received from an aircraft camera 210 at the light source detection module 212. In an embodiment, the aircraft camera 210 is disposed on a nose of the aircraft 200. In an embodiment, the light source detection module 212 is configured to receive the image from the aircraft camera 210 disposed on the aircraft nose during a landing phase of a flight.

The light source detection module 212 is configured to detect a plurality of light sources in the received image. In an embodiment, the light source detection module 212 is configured to detect light sources having a geometric shape. Examples of geometric shapes include, but are not limited to, a cylindrical shape, a circular shape, and a triangular shape. At 304, the light source detection module 212 is configured to define a region of interest (ROI) for each of the light sources based on the location of each light source in the image.

Light Source Detection

The light generated by a light source typically follows an omnidirectional pattern where the center of the light source is the brightest spot. The light generated by the light source typically follows a generally symmetrical circular pattern. The intensity of the light generated by the light source decreases with increasing radius with respect to the center of the light source. Examples of light sources where the generated light follows a circular pattern include, but are not limited to, traffic lights, system status light emitting diodes (LED), aircraft navigation lights, and vehicle navigation lights.

Light intensity and variations in light intensity based on distances from the center of a light source can be represented using mathematical distributions. Examples of mathematical distributions include, but are not limited to, a Gaussian distribution and a normal distribution. The probability density function (PDF) of a Gaussian distribution follows a curve. As the standard deviation incrementally increases, the curve typically becomes increasingly flatter. For narrower beam width laser lights, the standard deviation is relatively lower than for wider beam width laser lights. Wider beam laser lights have a dispersive nature resulting in relatively higher standard deviations. For example, the standard deviations associated with LED lights is typically lower compared to standard deviations associated with different signaling lights.

Figure 4:
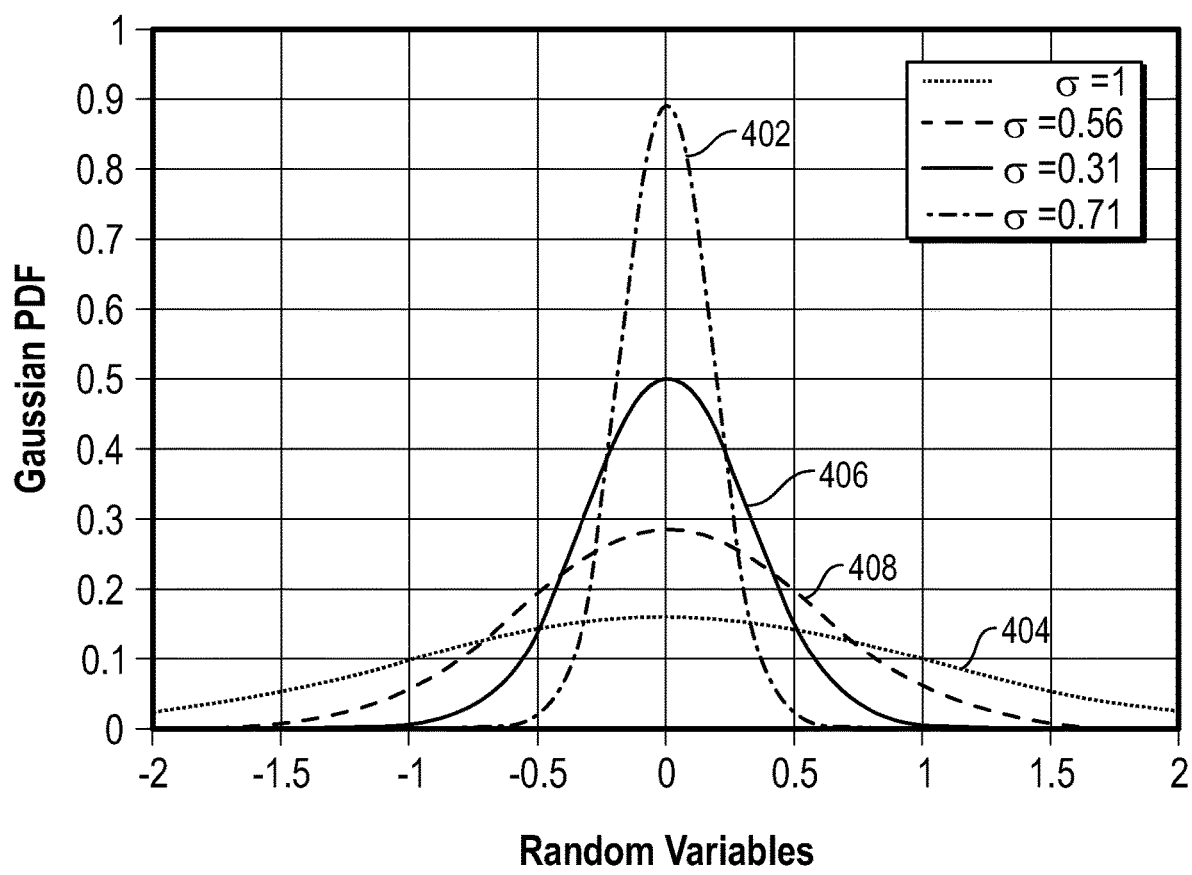
FIG. 4 is a graphical representation of examples of Gaussian distributions of light intensities associated with different light sources having different light beam widths in accordance with an exemplary embodiment.

Referring to FIG. 4, a graphical representation of examples of Gaussian distributions of light intensities associated with different light sources having different light beam widths in accordance with an exemplary embodiment is shown. The curve 402 represents standard deviations of light intensities associated with the narrowest beam width laser light in the example. The curve 404 represents standard deviations of light intensities associated with the widest beam width laser light in the example. The curve 406 and the curve 408 represent standard deviations of light intensities associated with laser lights having beam widths that fall between the narrowest beam width and the widest beam width in the example.

In many instances a technical challenge faced with the detection of light sources is that deep learning models using convolutional neural networks are often developed using large amounts of training data and are computationally expensive. An embodiment of the light source detection module 212 provides a solution to the technical challenge by implementing an embodiment of a light object selective search (LOSS) algorithm.

Figure 5:
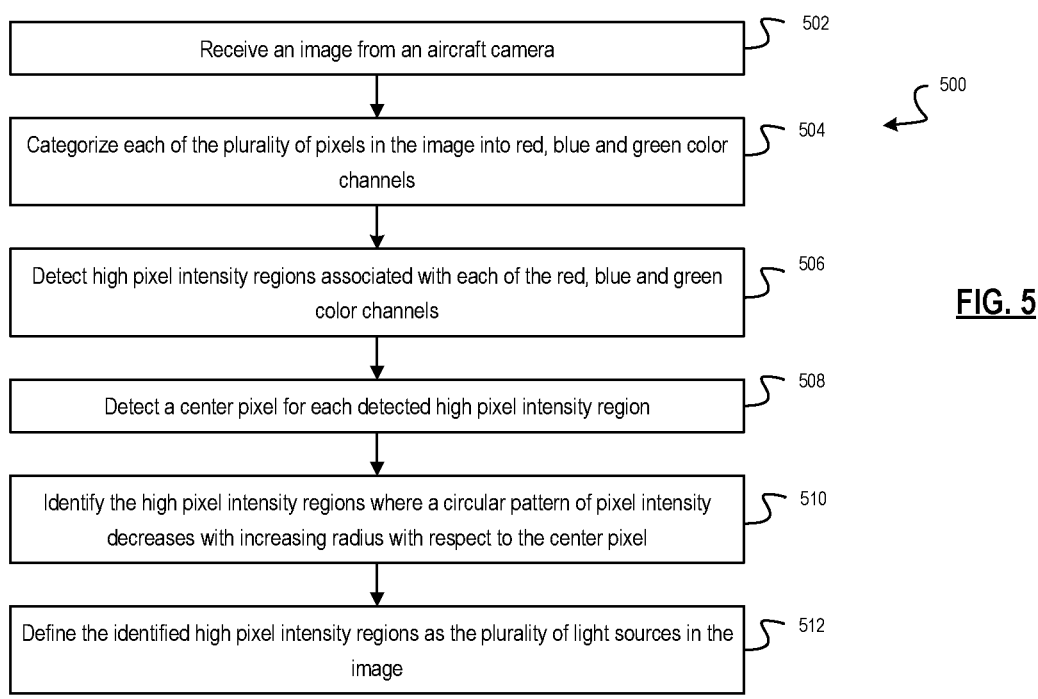
FIG. 5 is a flowchart representation of an exemplary embodiment of a method for detecting light sources in an image received from an aircraft camera using an embodiment of a LOSS algorithm.

Referring to FIG. 5, a flowchart representation of an embodiment of a method 500 for detecting light sources in an image received from an aircraft camera 210 using an embodiment of a LOSS algorithm is shown. The light source identification system 202 is configured to implement the method 500. In an embodiment, the light source detection module 212 is configured to implement the method 500.

At 502, the light source detection module 212 receives an image from an aircraft camera 210. The image is defined by a plurality of pixels. At 504, the light source detection module 212 categorizes each of the plurality of pixels in the image into red, blue, and green color channels. The light source detection module 212 splits the image Img into separate color channels where the color channels are red (R), blue (B), and green (G) color channels.

$$Img = \{R, G, B\}$$

At 506, the light source detection module 212 detects high pixel intensity regions ($Ch_{Ri}$, where i varies from 1 to n regions) associated with each of the red, blue, and green color channels.

$$Ch_{Max\_loc} = \{Ch_{R1}, Ch_{R2}, \ldots, Ch_{Rn}\} \text{ where } Ch \in \{R, G, B\}$$

At 508, the light source detection module 212 detects a center pixel ($Ch_{Ci}$, where i varies from 1 to n regions) for each detected high pixel intensity region.

$$Ch_{Max\_loc\_Ctr} = \{Ch_{C1}, ChC_2, \ldots, Ch_{Cn}\}$$

At 510, the light source detection module 212 identifies the high pixel intensity regions where a circular pattern of pixel intensity decreases with increasing radius with respect to the center pixel. In an embodiment, the light source detection module 212 finds the minimum distance $d_{min}$ from each center pixel to another nearest center pixel located at the edge of the associated high pixel intensity region.

$$Ch_{Max\_loc\_dmin} = \{Ch_{dmin1}, Ch_{dmin2}, \ldots, Ch_{dminn}\}.$$

Where $Ch_{dmin\_i} = \min Ch_{edge\_j} - Ch_{Ci})$ and edge_j $\forall$ (ej $\cup$ Ri)

ej edge points and edge_j are all the edge points of a specific high pixel intensity region Ri.

'$\forall$' represents 'for all', 'min' signifies minimum and 'U' indicates Union operator.

In an embodiment, the light source detection module 212 is configured to employ a Range Intensity Normalized Gaussian (RING) filter to identify the high pixel intensity regions in the image where the circular pattern of pixel intensity decreases in accordance with a Gaussian probability density function distribution model.

In an embodiment, the light source detection module 212 is configured to consider a parameter is padding (p). The light source detection module 212 is configured to define RING filters for each of the high pixel intensity regions in the image with a shape of {dmin1+p, dmin2+p, . . . , dminn+p} in two dimensions (2D).

The light detection module 212 is configured to consider dmini+p=D and define a Gaussian filter 'Gauss' of size D×D as Gauss(D,D)

$$\text{RING filter:} \frac{Gauss(D, D)}{\max(Gauss(D, D))} * \max(Ch.\text{Intensity})$$

The light detection module 212 is configured to extract image patches with a coordinate range as ChCX–dminX–p to ChCX+dminX+p in 2D with respect to the center pixel for each of the high pixel intensity regions.

The light detection module 212 is configured to find similarities between the RING filter with the extracted image patches with varying standard deviations S. Euclidean distances can be used to find similarities. The light detection module 212 forms a grid with the varying standard deviations S=0.1 to 0.9 and padding p=1:10 and records all distance values. For any <S,p> combination, where the lowest distance value is less than a given threshold value, a presence of light source located at $Ch_{CX}$ is indicated.

For each red, blue, and green color channel the LOSS algorithm finds high pixel intensity regions with the locations of a light center as the brightest spot or center pixel Then surrounding the brightest spot intensity (center pixel), the intensity of the light will gradually decrease with distance. Hence, in the image when the high pixel intensity regions are detected, the neighboring high pixel density region is compared with physical analogy as defined above. There may exist some objects in the image with the same highest intensity. But these objects are not light sources, as their intensity will not decrease in a circular pattern. To verify circular patterns of light intensity decrement, a Gaussian filter is used where the center of the filter has the highest value and the value gradually decreases in all directions from the center in accordance with a defined standard deviation. This approach finds similarities between surfaces of this Gaussian shape with lightness object in the image. But since the Gaussian PDF ranges between [0,1] and the color channel intensity can vary between 0 to 255, this implementation employs the use of a RING filter by shifting the dynamic range of the Gaussian PDF to the image channel intensity range. The Gaussian PDF for varying standard deviations is first normalized with its maximum value and then multiplied by the channel intensity range. If the object in the image is identified as a light source due to the presence of a circular omnidirectional pattern, dmin_i will be constant at a distance from the center of a circle (center pixel) to the circumference or the same radius. The shape of the RING filter is varied with padding since the intensity of the light generated by different types of light sources do not decrease at the same rate from the center (center pixel). The lower the distances from the RING filter from the image path under test, the better the indication of the presence of a light source location. An advantage of using a RING filter over a standard convolution method is it can approximate with lower computational time as that it involves norm rather that convolution.

Figure 6:
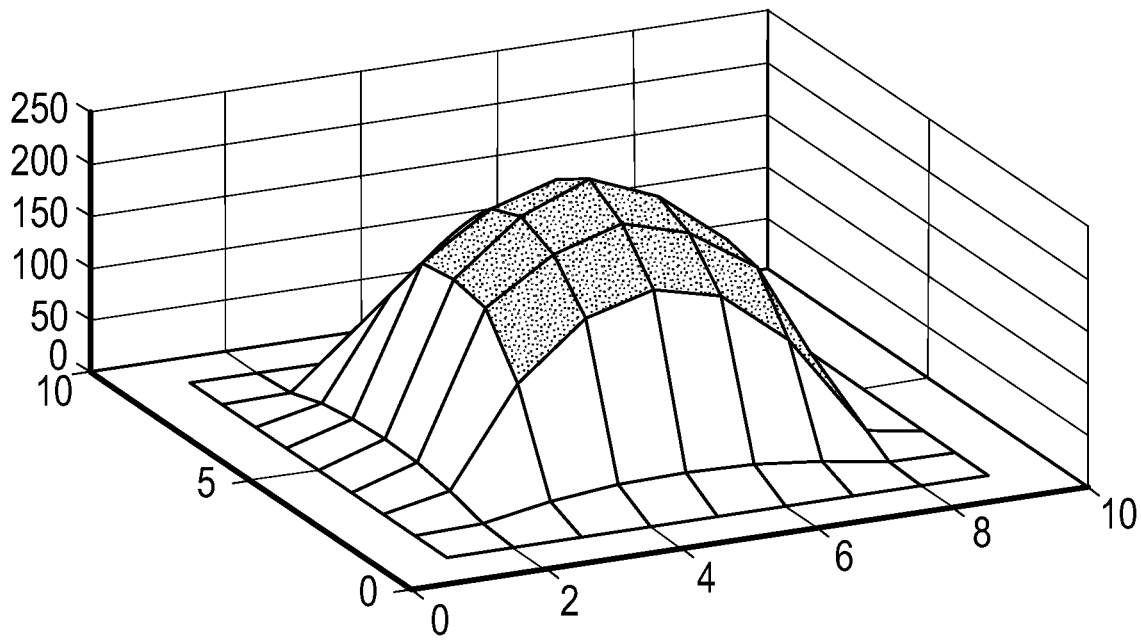
FIG. 6 is an example of a light source plot illustrating similarities between a RING filter having a standard deviation of 0.5 and a padding of 2 and intensities of a light source in an image in accordance with an embodiment.
Figure 6:

Referring to FIG. 6, an example of a light source plot illustrating similarities between a RING filter having a standard deviation of 0.5 and a padding of 2 and intensities of a light source in an image in accordance with an embodiment is shown. The example illustrates a Gaussian distribution that can be approximated as a surface using a RING distribution. The lighter shades of gray at the center of the surface plot illustrate the similarity between the two surfaces.

The LOSS algorithm does not involve a parametric-learning approach to detect light sources in an image. As described below, upon the detection of a light source in an image, deep learning-based approaches may be used to infer the distance and angle of the light source with respect to the aircraft camera 210 used to capture the image.

At 512, the light detection module 212 is configured to define the high pixel intensity regions at the plurality of light sources in the image received from the aircraft camera 210 In an embodiment, once the presence of a light source in the image is detected by the light detection module 212 using the LOSS algorithm, coordinates associated with the light source can be retrieved from the images as $Ch_{CX}$–dminX–p to ChCX+dminX+p in 2D, which will be a square image segment containing light source (also referred to as the ROI including the light source). In an embodiment, light detection module 212 is configured to generate the features associated with each ROI including a light source. For example, the feature of an ROI including a light source may be defined by the coordinates {X, Y, W, H} of the image. The coordinates of each ROI define the ROI associated with a light source.

Referring back to 306, the distance/angle generation module 214 is configured to determine a distance and a relative angle (phasor) between each of the plurality of light sources in the image and a location of the aircraft camera 210. In an embodiment, the distance/angle generation module 214 is configured to receive distance data from at least one geospatial sensor 22. The distance/angle generation module 214 is configured to determine the distance between each of the plurality of light sources and the location of the aircraft camera 210 based on the received distance data. In alternative embodiment, alternative mechanisms may be used to determine the distance between each of the plurality of light sources in the image and the location of the aircraft camera 210. The determination of the relative angle between each of the light sources and the location of the aircraft camera 210 is described in further detail below.

Distance and Relative Angle (Phasor) Determination

In an embodiment, the distance/angle generation module 214 is configured to determine the distance between each of the plurality of light sources and the location of the aircraft camera 210 using a neural network model trained using training camera images including light sources. The distance/angle generation module 214 is configured to retrieve the features of the ROI for each of the light sources for use as an input to the trained neural network. In an embodiment, the distance/angle generation module 214 is configured to retrieve the features of each ROI including a detected lights source, where the features are the coordinates {X, Y, W, H} of the ROI in the image.

The neural network is trained using light source datasets. A light source dataset is created using camera images including light sources and distance data obtained using LiDAR and/or other distance measuring geospatial sensors 22. The neural network is trained using the light source dataset. During the testing of the trained neural network model and during aircraft onboard processing time, no additional distance measuring sensors are used to provide distance data dist. The neural network can be trained to predict the features of each light source {X, Y, W, H, dist} from the input image containing the light sources received from the aircraft camera 210

Real-time model inferencing is implemented while the aircraft 200 is landing or taxiing at an airport. When an image is received from the aircraft camera 210, model inferencing is performed to predict the presence of a light source in an image received from an aircraft camera 210, associated coordinates of the light source in the image received from the aircraft camera 210, and the distance of the light source with respect to the location of the aircraft camera 210. The relative angle (phasor angle) between the light source coordinate and the center of the image received from the aircraft camera 210 is estimated to further infer future motion. It is to be noted that at the inferencing time, the relative angle data {angle} is also extracted.

Prior art approaches that learn to predict depth map of all the pixels of the image may be a quite time-consuming activity and may not be suitable for a fast running timeline of aircraft operations. To address this technical challenge, a depth map is only generated for the light emitter region (ROI including the light source) determined by the LOSS algorithm. Also, the phasor angle (relative angle) is inferred between the light source and the image center (center pixel) to future predict the motion of the leading vehicles/aircraft disposed ahead of the aircraft 200.

Gray Scale Conversion

At 308, the gray scale conversion module 216 is configured to generate a gray scale version of each ROI associated with a light source detected in the image received from the aircraft camera 210. The gray scale version of each ROI is generated based on pre-defined relationships between intensities of the red, green, and blue colors in each ROI in the image and gray intensities associated with the different intensities of the red, green and blue colors. Conversion of the red, blue, green intensities in each ROI in the image received from the aircraft camera 210 to a gray scale version is performed to avoid redundant computational operations for each of the color channels in later stages. In an embodiment, the database 228 is loaded with a list of red, green and blue equivalent gray scale values. The list of red, green and blue equivalent gray scale values can be a system specific configurable item.

Color Identification

At 310, the color identification module 218 is configured to compare the gray scale version of each ROI including a detected light source with pre-defined color specific histograms to identify a color of each of the plurality of light sources in the image received from the aircraft camera 210. Each pre-defined color specific histogram corresponds to a gray scale equivalent of an associated color.

The color of a light source may provide valuable information. For example, a driver of a vehicle may make a decision to 'Go' or to 'Stop' based on a color of a traffic light signal. Even though a color is defined by fixed red, blue, and green combination, there exists a range of primary color variations which are considered to define that color. For example, red, blue, and green colors having the values [255,255,255] define white light but red, blue, and green colors having the values [245,250,255] are also perceived by human eye as white light.

Figure 7:
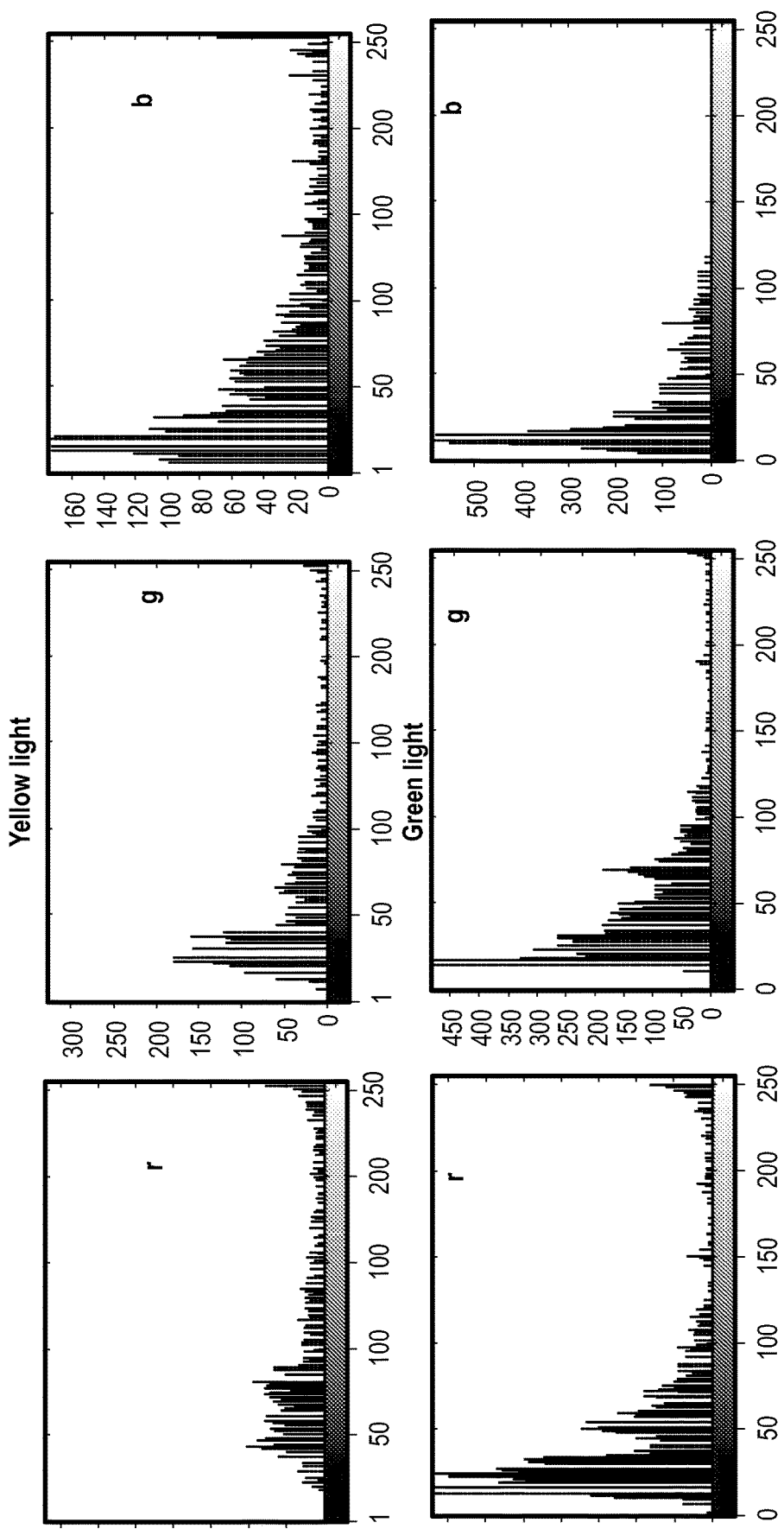
FIG. 7 illustrates examples of gray scale equivalent versions of pre-defined color histograms for the red, green and blue color channels of a yellow light source and a green light in accordance with an embodiment.

When dealing with an image including red, blue and green color channels it may be a challenge to set thresholds for individual red, blue, and green color channels associated with specific colors. Hence, the threshold is set on a grayscale equivalent version of each ROI including a light source in the image. The database 228 is pre-loaded with gray scale versions of pre-defined color-specific histograms. In an embodiment, for a system having pre-defined colors of light sources that the system expects to encounter, the database 228 is pre-loaded with the gray scale versions of the pre-defined color-specific histograms for those colors. The color of a light source in the image is determined by comparing the gray scale version of the associated ROI with the gray scale versions of the pre-defined color-specific histograms corresponding to the different colors in stored in the database 228. A cosine similarity or any other similarity matching algorithms can be used to perform the comparison. Referring to FIG. 7, illustrative examples of gray scale equivalent versions of pre-defined color histograms for the red, green and blue color channels of a yellow light source and a green light source in accordance with an embodiment are shown.

Light Source Type Identification

Referring back to FIG. 3, at 312, the light source type identification module 220 is configured to assign a light source type to each of the plurality of light sources in the image received from the aircraft camera 210. The light source type identification module 220 is configured to determine context data associated with the image received from the aircraft camera 210. For example, the context data may be situational awareness data. Examples of context data include, but are not limited to, location of the aircraft and location of the detected light sources. The light source type identification module 220 is configured to assign a light type to each of the plurality of lights detected in the image based on the color of the light source and the context data. The light source type may also be referred to a label assignment, where the label assigned to a light source identifies the light source type. Examples of light source types, include but are not limited to, a light source associated with a leading vehicle (such as for example another aircraft or a ground road vehicle), airfield ground light (AGL) sources, precision path approach indicator (PAPI) light sources, taxiway light sources on a runway, and navigation light sources on another aircraft.

In alternative embodiments, the camera that the image is received from may be a vehicle camera with a vehicle type associated with the vehicle camera. For example, the vehicle may be an aircraft or a road vehicle. The vehicle camera is mounted on the vehicle and configured to capture images for processing by a light source identification system 202 disposed at that vehicle. The context data may include a vehicle type associated with the vehicle camera, a vehicle location of the vehicle, and locations of a plurality of lights detected in an image captured by the vehicle camera and processed by the light source detection identification system 202.

Blinking Light Period Detection

In an embodiment, the blinking light processing module 222 is configured to determine blinking properties associated with blinking light sources in the image received from the aircraft camera 210. An example of a blinking property is a frequency (or period) of a blinking light source. The blinking light processing module 222 is configured to receive a set of successive images from the aircraft camera 212. The set of successive images includes the image under analysis by the light source identification system 202. The blinking light processing module 222 is configured to identify and analyze the ROI associated with each of the plurality of light sources in each of the set of successive images to ascertain whether a light source is in one of an ON state, an OFF state, and a blinking state. In an embodiment, the blinking light processing module 222 is configured to determine a blinking frequency (or period) associated with the blinking light source based on a blink rate histogram analysis of the ROI associated with the light source in successive images received from the aircraft camera 210.

A blinking light source having a specific color may provide insight into the light source type of the light source detected in the image received from the aircraft camera 210. The blinking frequency (or period) of the light source may provide further insight into the light source type of a light source detected in an image received from an aircraft camera 210. For example, the combination of a blinking frequency (or period) of a light source in combination with a color of a light source may enable the identification of a light source type as one of an aircraft navigation light, an ambulance light, a police vehicle light, and other systems that use light sources having a unique blinking frequency (or period) and a predefined color.

Once the coordinate information of an ROI associated with a light source in the image that is received from the aircraft camera 210 and under analysis by the light source identification system is determined, the area defined by the same coordinates are tracked over multiple successive images received from the aircraft camera 210. To track multiple light sources in motion, relative position of the light sources and a wider search window related to the extracted coordinates are maintained. In an embodiment, the blinking frequency (or period) detection is performed by histogram analysis. A light source in an ON state and in an OFF state generate different histograms of light intensity levels. In an ON state, a light source produces higher intensity values whereas in an OFF state, a light source produces lower intensity values. Two counters are used to detect an ON state and an OFF state for individual light sources. Once a light source is detected being in an ON state, its corresponding counter is incremented. After the light source is detected in an OFF state in multiple successive images received from the aircraft camera 210 and when the light source is determined to be in an ON state again in one of the successive images received from the aircraft camera, the blinking frequency (or period) is calculated. The blinking time period T is determined using the following equation:

$$T = \frac{ON}{ON + OFF}$$

In an embodiment, the blinking time period is related to the frames (images) per second (FPS) of capturing video from the aircraft camera 210. This helps to find a corresponding blinking frequency (or period) of a light source. In an embodiment, the light source type identification module 220 is configured to receive a blinking frequency (or period) of a light source detected in the image received from the aircraft camera 210 from the blinking light detection module 222 and determine a light source type for that light source based in part on a color of the light source and the blinking frequency (or period) of the light source.

Figure 8:
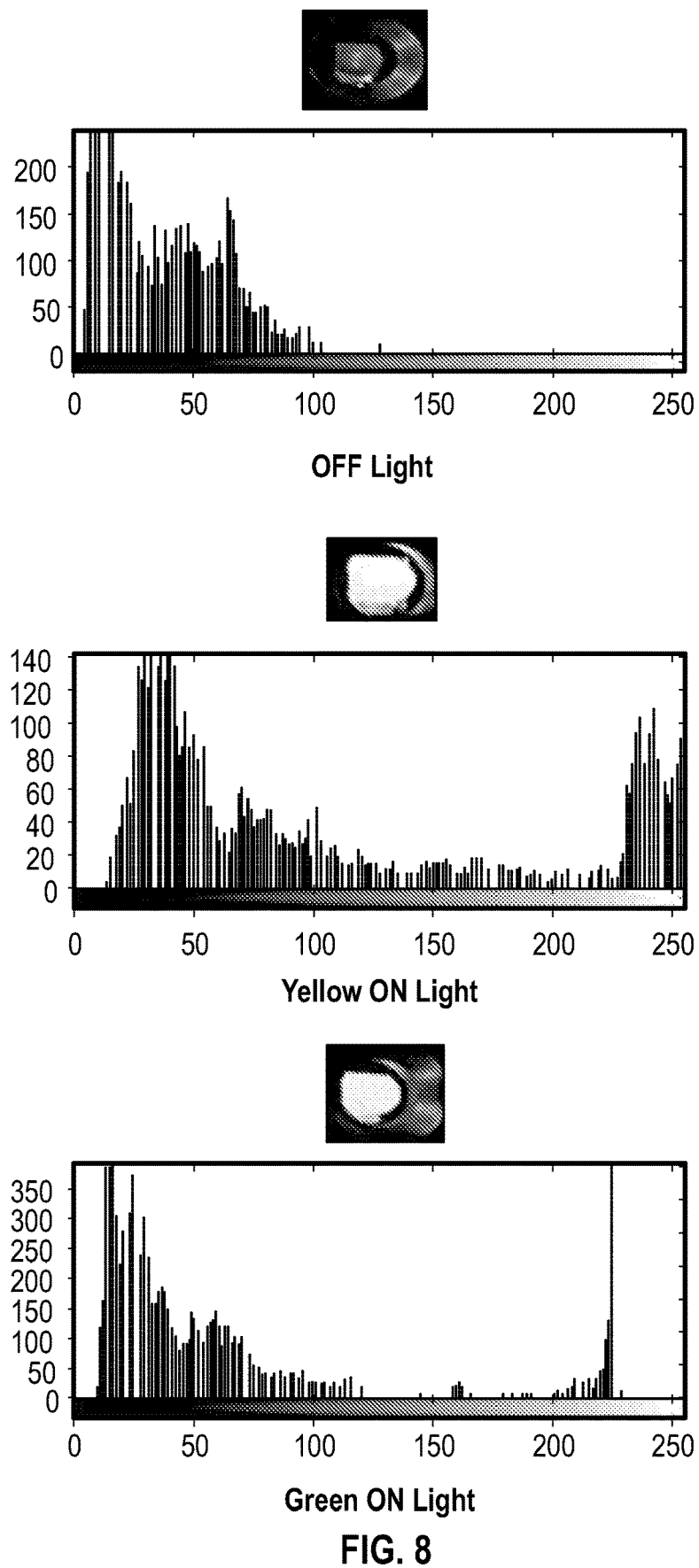
FIG. 8 illustrates examples of histograms illustrating a light source in an OFF state, a yellow light source in an ON state and a green light source in an ON state in accordance with an embodiment.
Figure 9:
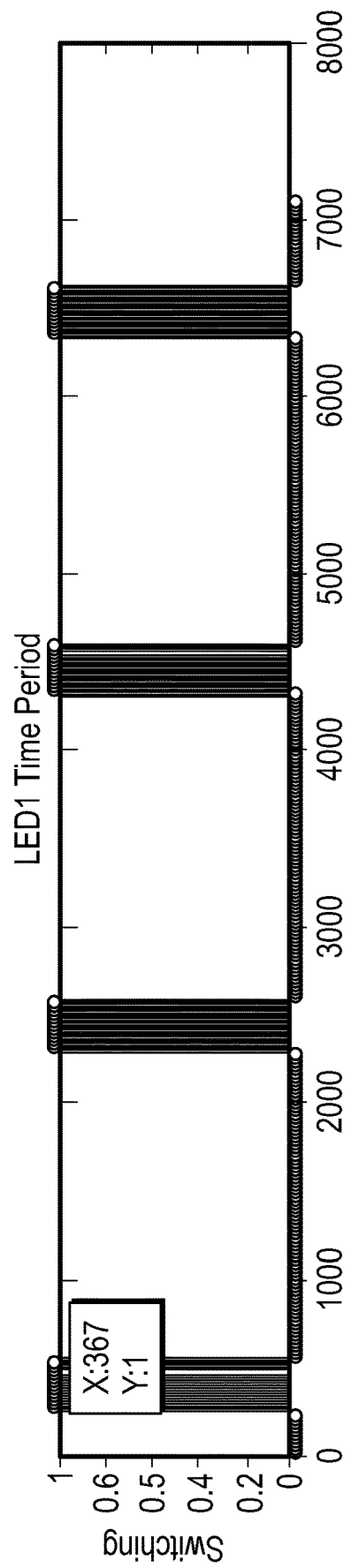
FIG. 9 is an example illustration of a graphical representation of an example of a detected blinking light source having a blinking period of 300 ms in accordance with an embodiment.

Referring to FIG. 8, examples of histograms illustrating a light source in an OFF state, a yellow light source in an ON state and a green light source in an ON state in accordance with an embodiment are shown. The histograms illustrating a light source in an OFF state, and light sources of different colors in an ON state are pre-loaded into the database 228. The blink light processing module 222 is configured to compare the histograms with a light source in successive images received from the aircraft camera 210 to determine whether a light source of a specific color is in an ON state or in an OFF state. Referring to FIG. 9, an example illustration of a graphical representation of an example of a detected blinking light source having a blinking period of 300 ms in accordance with an embodiment is shown.

Time Series Analysis of Leading Vehicle

Referring back to FIG. 3, at 316, the prediction module 224 is configured to implement time-series analysis of a leading vehicle disposed in front of a trailing aircraft 200. Examples of leading vehicles include another aircraft and a roadway vehicle. In an embodiment, the prediction module 224 is configured to determine whether one or more of the light sources in the image received from the aircraft camera 210 is associated with a leading vehicle and predict a future position of the leading vehicle based on distances between the one or more light sources and the aircraft camera 210, relative angles between the one or more light sources and the location of the aircraft camera 210. The light source types of the one or more light sources are defined based on an analysis of successive images received from the aircraft camera 210.

In an embodiment, the time-series analysis is implemented for aircrafts, urban air mobility (UAM), automobiles or any object under motion to predict a future position of leading vehicle disposed in front of a trailing aircraft 200 based on the available features derived from a light source, such as for example data regarding a turn indicator light of a leading vehicle. In an embodiment, in order to implement time-series analysis to generate a prediction, a memory unit for the network is trained with the observed features based on time-steps. Using recurrent unit, a model can be developed with input features as gray values of the light sources, associated distances, and associated relative angles to generate an output that predicts a future position of a leading vehicle.

In an embodiment, the prediction module 224 is configured to predict future positions of leading vehicles based on outputs received from one or more of the light source detection module 212, the distance/angle generation module 214, the gray scale conversion module 216, the color identification module 218, the light source type identification module 220, and the blinking light processing module 222.

At 318, the decision module 226 is configured to issue recommendations for display on a display device 14, issue an alert via a different output device of the aircraft 200, and/or implement an automated aircraft action in response to the outputs received from one or more of the light source detection module 212, the distance/angle generation module 214, the gray scale conversion module 216, the color identification module 218, the light source type identification module 220, the blinking light processing module 222, and the prediction module 224.

In an embodiment, the light source detection system 202 is configured to determine whether one or more of the light sources in an image received from the aircraft camera 210 is associated with a leading vehicle. The light source detection module 202 is configured to predict a future position of the leading vehicle based on distances between the one or more light sources and the aircraft camera 210, and relative angles between the one or more light sources and the location of the aircraft camera 210 as defined in successive images received from the aircraft camera 210 based on the determination.

In an embodiment, the light source detection system 202 is configured to generate a recommended aircraft action based on the predicted future position of the leading vehicle, the light source types of the one or more light sources, and whether at least one of the one or more light sources are in one of an ON state and an OFF state.

In an embodiment, the light source detection system 202 is configured to automatically implement an aircraft action based on the predicted future position of the leading vehicle, the light source types of the one or more light sources, and whether at least one of the one or more light sources are in one of an ON state and an OFF state.

In an embodiment, the light source detection system 202 is configured to provide a recommendation to implement vehicle action based on the context data wherein the context data comprises situational awareness data.

In an embodiment, the light source detection system 202 is configured to receive the image from the aircraft camera 210, identify a subset of the plurality of light sources in the image as being airport light sources, determine whether an onboard pilot microphone malfunction has occurred, and auto-initiate communication with an air traffic controller (ATC) based on the determination.

In an embodiment, the light source detection system 202 is configured to receive the image from the aircraft camera 210, identify a subset of the plurality of light sources in the image as a plurality of airfield ground light (AGL) light sources, and detect a malfunction of one or more of the AGL light sources based on an analysis of the identified plurality of AGL light sources in the image.

In an embodiment, the light source detection system 202 is configured to receive the image from the aircraft camera 210, identify a subset of the plurality of light sources in the image as a plurality of precision approach path indicator (PAPI) lights, and compute an aircraft altitude offset based on the locations of the plurality of PAPI lights with respect to a location of the aircraft.

In an embodiment, the light source detection system 202 is configured to receive the image from the aircraft camera 210, identify a subset of the plurality of light sources as a plurality of taxiway lights on a runway, and implement auto-taxing assistance of the aircraft on the runway based on the locations of the plurality of taxiway lights with respect to a location of the aircraft.

In an embodiment, the light source detection system 202 is configured to identify a subset of the plurality of light sources in an image received from the aircraft camera 210 as a plurality of aircraft navigational lights sources of another aircraft, identify an aircraft type and an aircraft location of the other aircraft based on locations of the plurality of aircraft navigational lights source on the other aircraft, and provide a recommendation to implement vehicle action based the identified aircraft type and the aircraft location.

Figure 10:
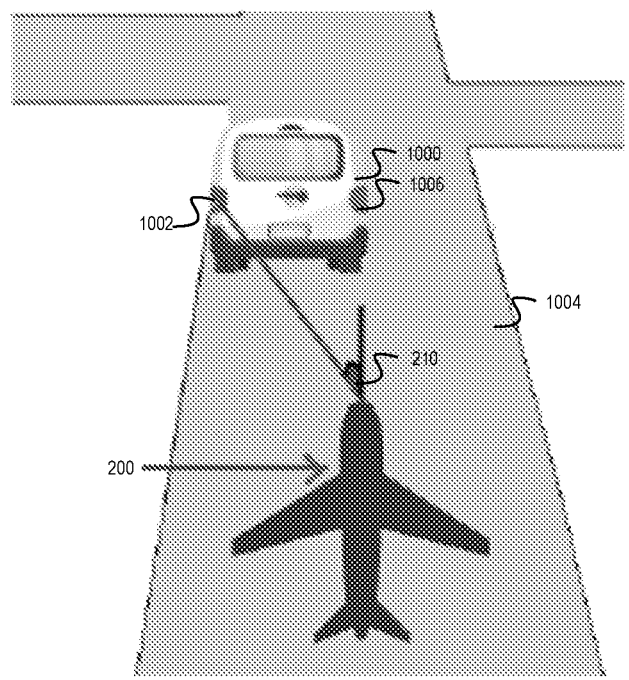
FIG. 10 an example illustration of an aircraft trailing a leading roadway vehicle at an airport taxiway.

Referring to FIG. 10, an example illustration of an aircraft 200 trailing a leading roadway vehicle 1000 at an airport taxiway 1004 is shown. The prediction module 224 is configured to predict future motion of the leading roadway vehicle 100 to enable the decision module 226 to issue a recommendation on a display device 14 or via a different output device of the aircraft 200 to implement increasing a speed of the aircraft 200 or applying brakes to slow down the speed of the aircraft 200. The prediction module 224 is configured to detect the state of the light source 1002 that has been identified as being a light source type that is a turn indicator on the leading vehicle 1000 and predict future motion of the leading vehicle 1000 based on this information. If the prediction module 224 receives data from the blinking light processing module 222 that only the left indicator 1002 of the leading vehicle 1000 is blinking and data from the distance/angle generation module 214 that the leading vehicle 100 is disposed at a close distance with a high relative angle value with respect to the aircraft camera 210, the prediction module 224 is configured to predict the future motion of the leading vehicle 1000 as preparing to make a right turn and the decision module 226 is configured to display a recommendation on a display device 14 or issue an alert via a different output device of the trailing aircraft 200 to slow down and move to the right side of the airport taxiway 1004. If the prediction module 224 receives data from the blinking light processing module 222 that the left indicator 1002 and a right indicator 1006 of the leading vehicle 1000 are both blinking, the prediction module 224 is configured to predict a future position of the leading vehicle 1000 based on the leading vehicle 1000 being assessed as a slow moving vehicle and the decision module 226 is configured to display a recommendation on a display device 14 or issue an alert via a different output device of the trailing aircraft 200 to slow down and not overtake the leading vehicle 1000 using the right side of the airport taxiway 1004. If the prediction module 224 receives data from the blinking light processing module 222 that the right indicator light 1002 and the left indicator light 1004 are both on and not blinking, the decision module 226 is configured to display a recommendation on a display device 14 or generate an alert on a different output device of the trailing aircraft 200 to implement braking to stop the aircraft 200 as soon as possible.

The features such as gray values, distances and angles, and labels that indicate a left turn, right turn, stop, and other features can be added based on user needs to make the model more robust. Videos/Live feed of these scenarios can be trained with recurrent models and can be used during testing in real-time.

In an embodiment, the decision module 226 is configured to make decisions, such as for example, including but not limited to, slowing down, taking a left or right turn at a certain angle, stopping the aircraft 200, notifying ATC about the presence of other vehicles and/or aircrafts on the taxiway and presenting aircraft status for AGL processing. Similar principles can be applied for UAVs near the runway where it senses collision based on the landing/take-off of other aircraft as indicated by the other aircraft's navigation lights. In an embodiment, the decision module 226 issues decisions/recommendations based on the observing object behavior. It is an application dependent approach.

Figure 11:
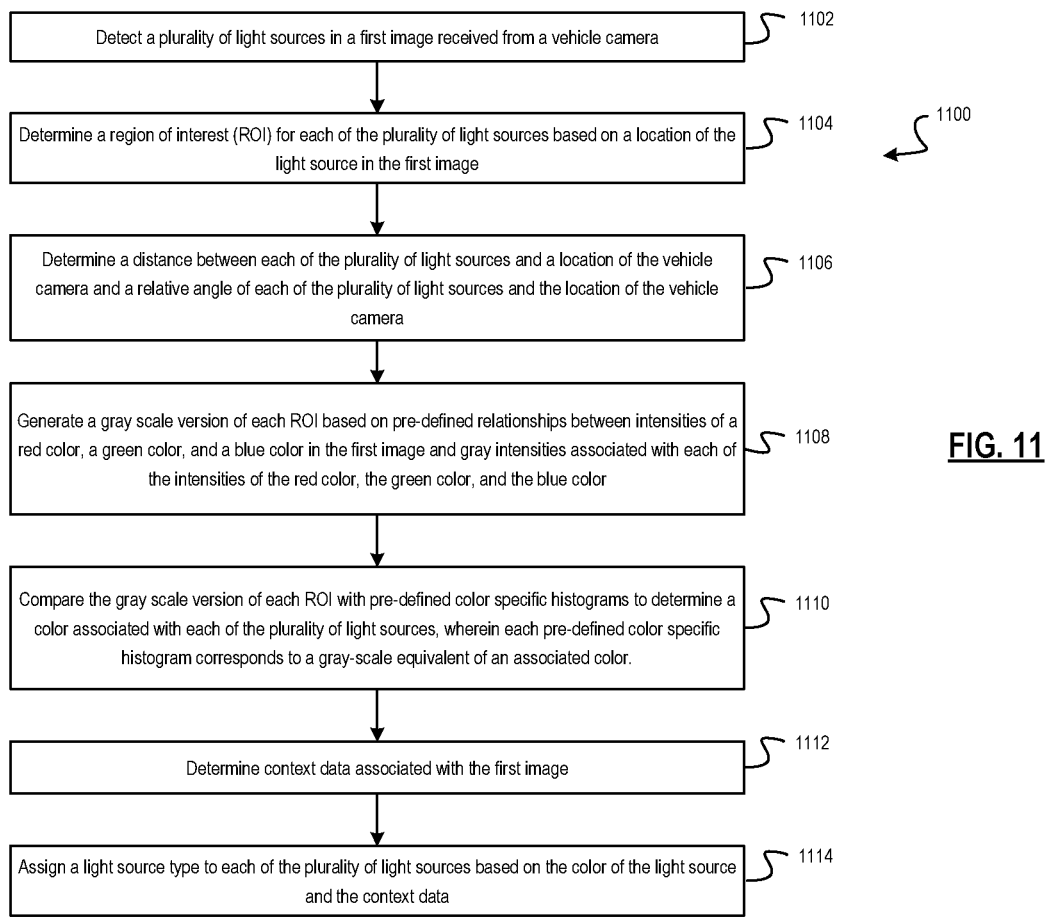
FIG. 11 is a flowchart representation of an exemplary embodiment of a method of identifying light sources at an airport.

Referring to FIG. 11, a flowchart representation of an exemplary embodiment of a method 1100 of identifying light sources at an airport is shown. The method 1100 is implemented by an embodiment of the light source identification system 202. At 1102, a plurality of light sources is detected in a first image received from a vehicle camera. At 1104, a region of interest is determined for each of the plurality of light sources based on a location of the light sources in the first image. At 1106, a distance is determined between each of the plurality of light sources and a location of the vehicle camera and a relative angle is determined between each of the plurality of light sources and the location of the vehicle camera. At 1108, a gray scale version of each region of interest is generated based on pre-defined relationships between intensities of a red color, a green color and a blue color in the first image and gray intensities associated with each of the intensities of the red color, the green color, and the blue color. At 1110, the gray scale version of each region of interest is compared with pre-defined color specific histograms to determine a color associated with each of the plurality of light sources, wherein each pre-defined color specific histogram corresponds to a gray-scale equivalent of an associated color. At 1112, context data associated with the first image is determined. At 1114, a light source type is assigned to each of the plurality of light sources based on the color of the light source and the context data.

Example Implementations

Figure 12:
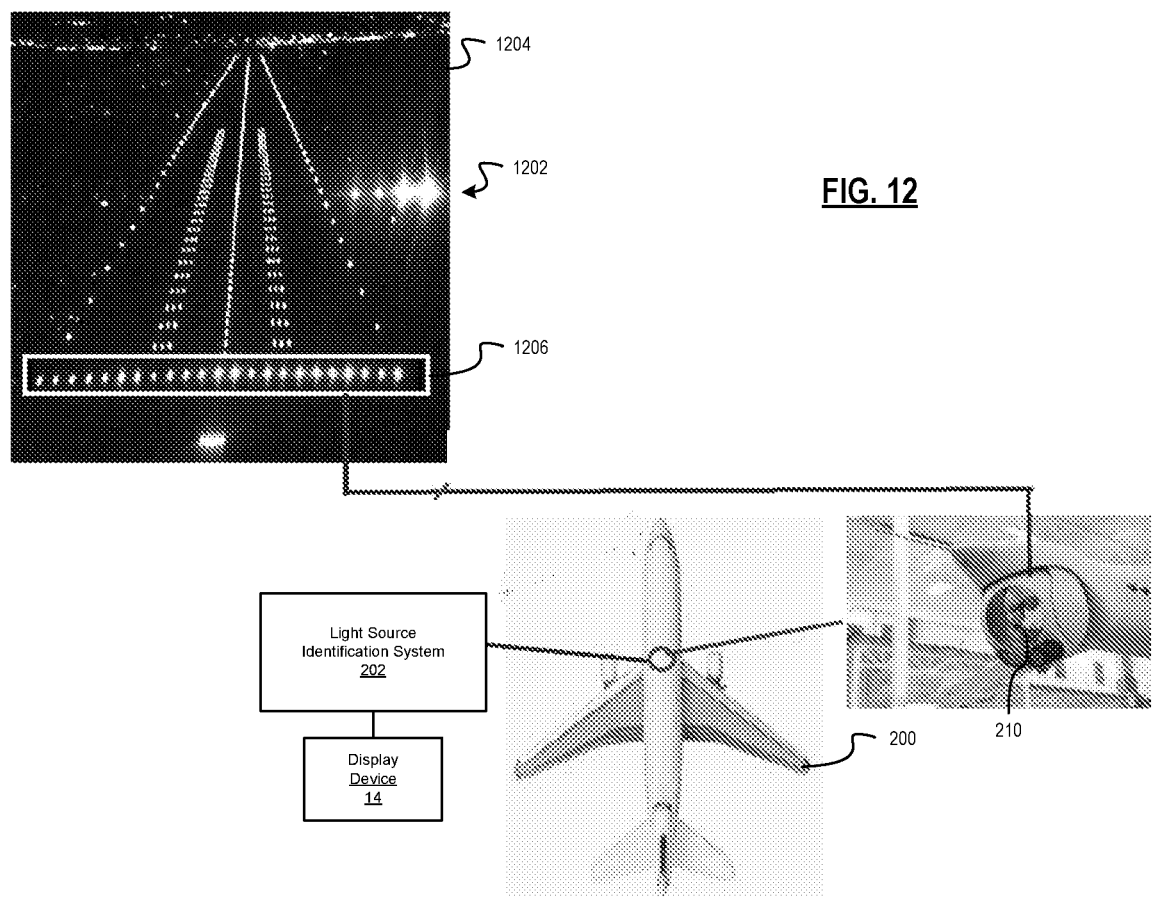
FIG. 12 is an illustration of an example implementation of an embodiment of a light source identification system.

Referring to FIG. 12, an illustration of an example implementation of an embodiment of a light source identification system 202 is shown. The aircraft 200 includes an aircraft camera 210 and an embodiment of the light source identification system 202. In the example, the aircraft is approaching a runway 1202 at an airport for landing. The aircraft camera 210 has captured an image 1204 of a visible area of the runway 1202. The image 1204 includes a plurality of different types of light sources that are disposed on the visible area of the runway 1202. While there are a plurality of different light sources on the runway 1202, the description with respect to the example focuses on the green threshold AGL type of light sources 1206.

The controller 204 of the aircraft 200 receives airport data (from a database or from ATC), GPS data from a geospatial sensor 22, and automatic dependent surveillance-broadcast (ADS-B) data to determine a location and a position of the aircraft 200. The light source identification system 202 identifies the light sources 1206 as green threshold AGL type of light sources 1206 on the runway 1202. Based on the location/position of the aircraft 200 with respect to the green threshold AGL type of light sources 1206 on the runway 1202, the light source identification system 202 issues an alert "Prepare to land" for display on an onboard display device 14. The light source identification system 202 may also issue an aural "Prepare to land" alert. The "Prepare to land" alert is an example of a situational awareness alert.

Figure 13A:
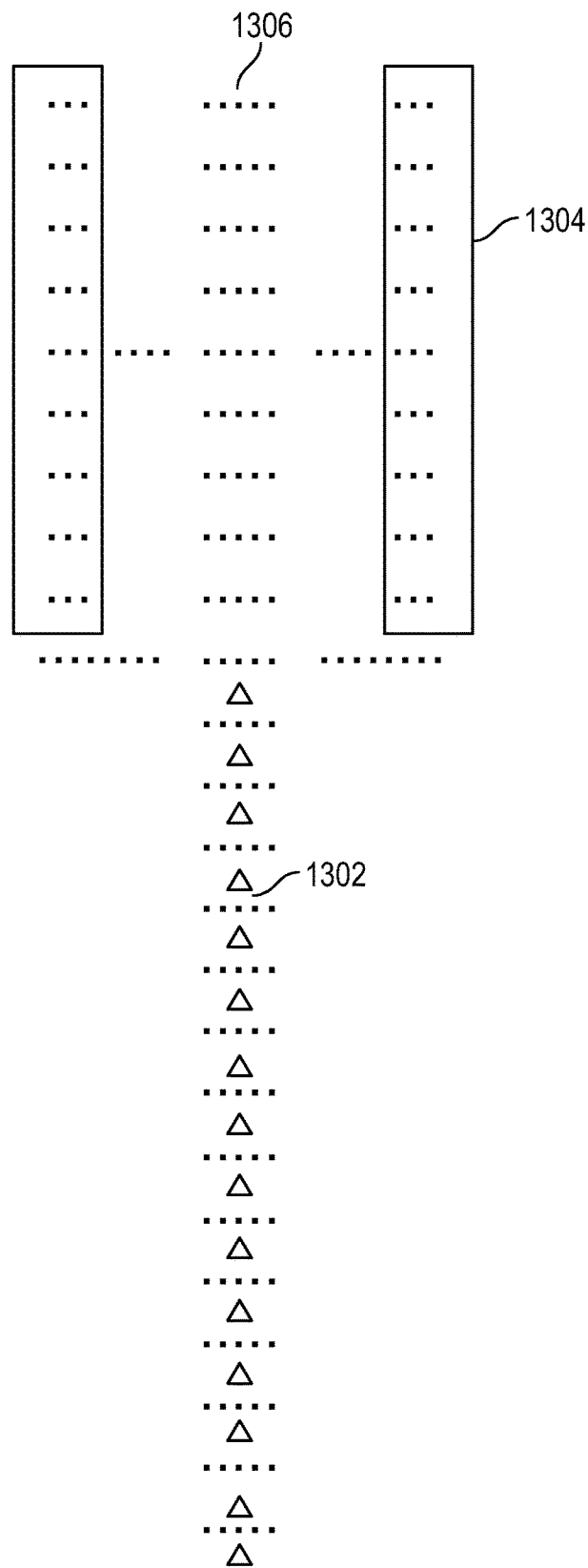
FIG. 13(a)-13(b) is an illustration of another example implementation of an embodiment of a light source identification system.
Figure 13B:
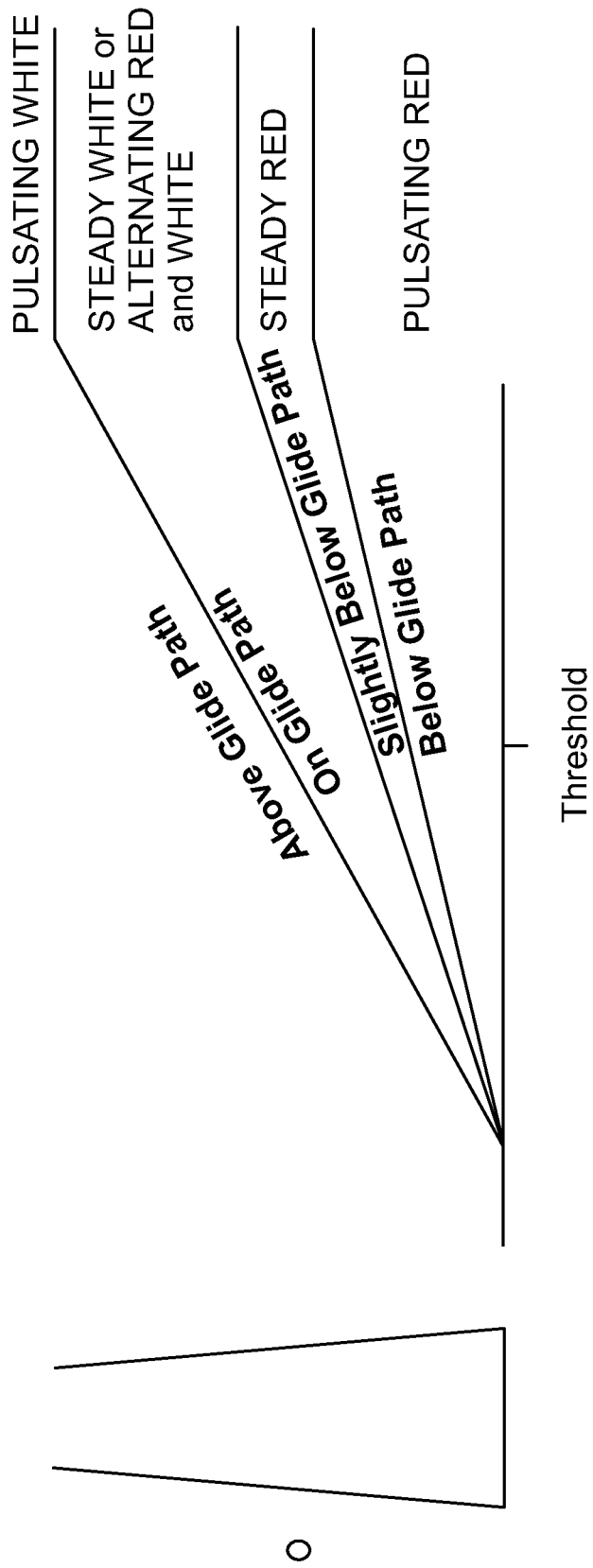

Referring to FIG. 13(a)-13(b), an illustration of another example implementation of an embodiment of a light source identification system 202 is shown. FIG. 13(a) is a schematic representation of a runway including three different types of light sources. The three different types of light sources are flashing lights 1302 represented by triangles, steady burning red lights 1304 (represented as circles within dashed rectangular boxes); and steady burning white lights 1306 (represented as circles outside of the dashed rectangular boxes). Depending on the location and/or position of the aircraft 200 with respect to the runway, one or more of the different types of light sources on the runway appear visible or not visible from the perspective of the aircraft 200. In addition, one or more of the different types of light sources viewed from the aircraft perspective appear as steady light sources or pulsating (blinking) light sources.

Referring to FIG. 13b, an example of alerts issued by the light source identification system 202 in response to a location/position of the aircraft 200 and a view of the plurality of light sources on the runway in an image captured by the aircraft camera 210 as the aircraft 200 is preparing to land at an airport is shown. The image provides a view of the light sources on the runway from the perspective of the landing aircraft 200. The view of the light sources from the perspective of the landing aircraft 200 provides insight into whether the aircraft is on a glide path for landing.

For example, if light source identification system 202 identifies the steady burning white light sources as pulsating (blinking) white light sources in an image captured by the aircraft camera 212, the light source identification system 202 issues an alert that the aircraft 200 is above the glide path.

If the light source identification system 202 identifies the steady burning white light sources as steady burning white light sources in an image captured by the aircraft camera 212, the light source identification system 202 issues an alert that the aircraft 200 is on the glide path. If the light source identification system 202 identifies the steady burning white light sources and the steady red burning light sources as steady burning alternating red and white light sources in an image captured by the aircraft camera 212, the light source identification system 202 issues an alert that the aircraft 200 is on the glide path.

If the light source identification system 202 identifies the steady burning red light sources as steady burning red light sources in an image captured by the aircraft camera 212 (without identifying any white light sources), the light source identification system 202 issues an alert that the aircraft 200 is slightly below the glide path. If the light source identification system 202 identifies the steady burning red light sources as pulsating (blinking) red light sources in an image captured by the aircraft camera 212, the light source identification system 202 issues an alert that the aircraft 200 is below the glide path.

Technical challenges are often encountered while landing an aircraft during the night and under low visibility conditions. In some instances, poor lighting visibility may create relatively higher risk aircraft landing situations. Globally, very few airports have Category 3 (CAT-3) runway systems, some airports have Category 2 (CAT-2) runway systems, and many airports have Category 1 (CAT-1) runways. In many instances, airport runways and taxiways may be equipped with relatively poor lighting. Improper maintenance of runway lighting and taxiway lighting systems may result in poor lighting conditions at an airport. Poor lighting conditions may impact aircraft safety in on-the-fly vision-based landings. Poor lighting and other types of low visibility conditions may impact aircraft safety and result in adverse aircraft incidents. Examples of adverse aircraft incidents include, include, but are not limited to, near misses, accidents, and crashes.

The described systems and methods present technical solutions to the described technical challenges by enabling detection of properties of lights sources on runways and taxiways at an airport under poor lighting and low visibility conditions and identification of the light sources to reduce the occurrence of adverse aircraft incidents. Examples of light properties include, but are not limited to, light source colors, light source intensities, frequencies of blinking lights sources, and combinations of different types of lights sources.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:
    a processor; and
    a memory, the memory comprising instructions that upon execution by the processor, cause the processor to:
        detect a plurality of light sources in a first image received from a vehicle camera;
        determine a region of interest for each of the plurality of light sources based on a location of the light source in the first image;
        determine a distance between each of the plurality of light sources and a location of the vehicle camera and a relative angle between each of the plurality of light sources and the location of the vehicle camera;
        generate a gray scale version of each region of interest based on pre-defined relationships between intensities of a red color, a green color and a blue color in the first image and gray intensities associated with each of the intensities of the red color, the green color, and the blue color;
        compare the gray scale version of each region of interest with pre-defined color specific histograms to determine a color associated with each of the plurality of light sources, wherein each pre-defined color specific histogram corresponds to a gray-scale equivalent of an associated color;
        determine context data associated with the first image; and
        assign a light source type to each of the plurality of light sources based on the color of the light source and the context data.

2. The system of claim 1, wherein the memory comprises further instructions that upon execution by the processor, cause the processor to:
    categorize each of a plurality of pixels in the first image into one of a red color channel, a blue color channel, and a green color channel;
    detect high pixel intensity regions associated with the red color channel, the blue color channel, and the green color channel;
    detect a center pixel for each detected high intensity pixel region;
    identify the high pixel intensity regions where a circular pattern of pixel intensity decreases with increasing radius with respect to the associated center pixel; and
    define the identified high pixel intensity regions as the plurality of light sources in the first image.

3. The system of claim 2, wherein the memory comprises further instructions that upon execution by the processor, cause the processor to employ a Range Intensity Normalized Gaussian (RING) filter to identify the high pixel intensity regions where the circular pattern of pixel intensity decreases in accordance with a Gaussian probability density function distribution model.

4. The system of claim 1, wherein the memory comprises further instructions that upon execution by the processor, cause the processor to determine the distance between each of the plurality of light sources and the location of the vehicle camera using a neural network model trained using training camera images including light sources.

5. The system of claim 1, wherein the memory comprises further instructions that upon execution by the processor, cause the processor to determine the distance between each of the plurality of light sources and the location of the vehicle camera based on distance data received from at least one sensor at a vehicle associated with the vehicle camera.

6. The system of claim 1, wherein the memory comprises further instructions that upon execution by the processor, cause the processor to determine whether a first one of the plurality of light sources is in one of an ON state or an OFF state based on an analysis of the region of interest associated with the first one of the plurality of light sources in successive images received from the vehicle camera, the successive images including the first image.

7. The system of claim 1, wherein the memory comprises further instructions that upon execution by the processor, cause the processor to determine a blinking frequency associated with a blinking state of a first one of the plurality of light sources based on a blink rate histogram analysis of the region of interest associated with the first one of the plurality of light sources in successive images received from the vehicle camera, the successive images including the first image.

8. The system of claim 1, wherein the memory comprises further instructions that upon execution by the processor, cause the processor to determine first context data associated with a first one of the plurality of light sources, wherein the first context data comprises at least one of a vehicle type of a vehicle associated with the vehicle camera, a vehicle location of the vehicle, and a location of the first one of the plurality of light sources.

9. The system of claim 1, wherein the memory comprises further instructions that upon execution by the processor, cause the processor to:
    determine whether a first one of the plurality of light sources in the first image is associated with a leading vehicle; and
    predict a future position of the leading vehicle based on a first distance between the first one of the plurality of light sources and the vehicle camera, a first relative angle between the first one of the plurality of light sources and the location of the vehicle camera, a first light source type of the first one of the plurality of light sources as defined in successive images received from the vehicle camera based on the determination.

10. The system of claim 9, wherein the memory comprises further instructions that upon execution by the processor, cause the processor to generate a recommended vehicle action based on the future position of the leading vehicle, the first light source type of the first one of the plurality of light sources, and whether the first one of the plurality of light sources is in one of an ON state or an OFF state.

11. The system of claim 9, wherein the memory comprises further instructions that upon execution by the processor, cause the processor to implement a vehicle action based on the future position of the leading vehicle, the first light source type of the first one of the plurality of light sources, and whether the first one of the plurality of light sources is in one of an ON state or an OFF state.

12. The system of claim 1, wherein the vehicle camera is associated with an aircraft.

13. The system of claim 1, wherein the memory comprises further instructions that upon execution by the processor, cause the processor to provide a recommendation to implement vehicle action based on the context data wherein the context data comprises situational awareness data.

14. The system of claim 1, wherein the memory comprises further instructions that upon execution by the processor, cause the processor to:
receive the image from the vehicle camera associated with an aircraft;
identify a subset of the plurality of light sources as being airport light sources;
determine whether an onboard pilot microphone malfunction has occurred; and
auto-initiate communication with an air traffic controller (ATC) based on the determination.

15. The system of claim 1, wherein the memory comprises further instructions that upon execution by the processor, cause the processor to:
receive the image from the vehicle camera associated with an aircraft;
identify a subset of the plurality of light sources as a plurality of airfield ground light (AGL) light sources; and
detect a malfunction of a first AGL light source based on an analysis of the identified plurality of AGL light sources in the image.

16. The system of claim 1, wherein the memory comprises further instructions that upon execution by the processor, cause the processor to:
receive the image from the vehicle camera associated with an aircraft;
identify a subset of the plurality of light sources as a plurality of precision approach path indicator (PAPI) lights; and
compute an aircraft altitude offset based on locations of the plurality of PAPI lights with respect to a location of the aircraft.

17. The system of claim 1, wherein the memory comprises further instructions that upon execution by the processor, cause the processor to:
receive the image from the vehicle camera associated with an aircraft;
identify a subset of the plurality of light sources as a plurality of taxiway lights on a runway; and
implement auto-taxing assistance of the aircraft on the runway based on locations of the plurality of taxiway lights with respect to a location of the aircraft.

18. The system of claim 1, wherein the memory comprises further instructions that upon execution by the processor, cause the processor to:
identify a subset of the plurality of light sources as a plurality of aircraft navigational lights sources of an aircraft;
identify an aircraft type and an aircraft location of the aircraft based on locations of the plurality of aircraft navigational lights source on the aircraft; and
provide a recommendation to implement vehicle action based the identified aircraft type and the aircraft location.

19. A method comprising:
detecting a plurality of light sources in a first image received from a vehicle camera;
determining a region of interest for each of the plurality of light sources based on a location of the light sources in the first image;
determining a distance between each of the plurality of light sources and a location of the vehicle camera and a relative angle between each of the plurality of light sources and the location of the vehicle camera;
generating a gray scale version of each region of interest based on pre-defined relationships between intensities of a red color, a green color and a blue color in the first image and gray intensities associated with each of the intensities of the red color, the green color, and the blue color;
comparing the gray scale version of each region of interest with pre-defined color specific histograms to determine a color associated with each of the plurality of light sources, wherein each pre-defined color specific histogram corresponds to a gray-scale equivalent of an associated color;
determining context data associated with the first image; and
assigning a light source type to each of the plurality of light sources based on the color of the light source and the context data.

20. The method of claim 1, further comprising:
categorizing each of a plurality of pixels in the first image into one of a red color channel, a blue color channel, and a green color channel;
detecting high pixel intensity regions associated with the red color channel, the blue color channel, and the green color channel;
detecting a center pixel for each detected high intensity pixel region;
identifying the high pixel intensity regions where a circular pattern of pixel intensity decreases with increasing radius with respect to the associated center pixel; and
defining the identified high pixel intensity regions as the plurality of light sources in the first image.

* * * * *